US012068453B2

United States Patent
Tanaka et al.

(10) Patent No.: US 12,068,453 B2
(45) Date of Patent: Aug. 20, 2024

(54) SOLID ELECTROLYTE MATERIAL AND BATTERY INCLUDING THE SAME

(71) Applicant: Panasonic Intellectual Property Management Co., Ltd., Osaka (JP)

(72) Inventors: Yoshiaki Tanaka, Kyoto (JP); Koki Ueno, Osaka (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 611 days.

(21) Appl. No.: 17/233,544

(22) Filed: Apr. 19, 2021

(65) Prior Publication Data

US 2021/0249683 A1    Aug. 12, 2021

Related U.S. Application Data

(63) Continuation of application No. PCT/JP2019/042907, filed on Oct. 31, 2019.

(30) Foreign Application Priority Data

Dec. 28, 2018 (JP) .................. 2018-248585
Dec. 28, 2018 (JP) .................. 2018-248586
Jul. 4, 2019 (JP) .................. 2019-125548
Aug. 30, 2019 (JP) .................. 2019-159080

(51) Int. Cl.
    *H01M 10/0562* (2010.01)
(52) U.S. Cl.
    CPC .. *H01M 10/0562* (2013.01); *H01M 2300/008* (2013.01)

(58) Field of Classification Search
    CPC ................................. H01M 10/0562
    See application file for complete search history.

(56) References Cited

U.S. PATENT DOCUMENTS

| | | | |
|---|---|---|---|
| 2004/0151986 A1 | 8/2004 | Park et al. | |
| 2012/0301796 A1 | 11/2012 | Ohtomo et al. | |
| 2017/0162902 A1 | 6/2017 | Ohta et al. | |
| 2018/0076452 A1 | 3/2018 | Sasaki et al. | |
| 2018/0309167 A1* | 10/2018 | Kaga | H01M 4/661 |
| 2021/0242494 A1 | 8/2021 | Tanaka et al. | |

(Continued)

FOREIGN PATENT DOCUMENTS

| | | |
|---|---|---|
| CN | 102780031 B | 3/2016 |
| CN | 107431242 A | 12/2017 |
| JP | 10-316424 A | 12/1998 |

(Continued)

OTHER PUBLICATIONS

English Translation of Chinese Search Report dated Jun. 10, 2023 for the related Chinese Patent Application No. 201980062289.0.

(Continued)

*Primary Examiner* — Maria Laios
*Assistant Examiner* — Jordan E Berresford
(74) *Attorney, Agent, or Firm* — Rimon P.C.

(57) ABSTRACT

A solid electrolyte material according to the present disclosure consists essentially of Li, M, O, and X. M is at least one element selected from the group consisting of Nb and Ta, and X is at least one element selected from the group consisting of Cl, Br, and I.

13 Claims, 4 Drawing Sheets

(56) References Cited

U.S. PATENT DOCUMENTS

2021/0249683 A1     8/2021     Tanaka et al.

FOREIGN PATENT DOCUMENTS

| | | |
|---|---|---|
| JP | 2004-235155 | 8/2004 |
| JP | 2006-156284 A | 6/2006 |
| JP | 2011-014445 | 1/2011 |
| JP | 2011-129312 | 6/2011 |
| JP | 2012-054071 A | 3/2012 |
| JP | 2020-137153 A1 | 11/2021 |
| JP | 2020-137155 A1 | 11/2021 |

OTHER PUBLICATIONS

English Translation of Chinese Search Report dated Aug. 6, 2023 for the related Chinese Patent Application No. 201980074838.6.

International Search Report of PCT application No. PCT/JP2019/042907 dated Nov. 26, 2019.

The Extended European Search Report dated Feb. 4, 2022 for the related European Patent Application No. 19901589.2.

The Extended European Search Report dated Feb. 4, 2022 for the related European Patent Application No. 19904950.3.

Yongjia Zhang et al: "Magnetic Properties in $Li_{1-x}A_{x}NbO_{3}$ ($A=Ca$, Sr, and Ba) and $LiNbO_{3-y}M_{y}$ ($M=F$, Cl, and Br) From First-Principles Study", IEEE Transactions on Magnetics, IEEE, USA, vol. 47, No. 10, Oct. 1, 2011 (Oct. 1, 2011), pp. 2916-2919, XP011383605.

Phraewphiphat Thanya et al: "Synthesis and Lithium-Ion Conductivity of $LiSrB_2O_6F$ (B=Nb5+, Ta5+) with a Pyrochlore Structure", Journal of the Japan Society of Powder and Powder Metallurgy, Funtai Funmatsu Yakin Kyokai, JP vol. 65, No. 1 Feb. 3, 2018 (Feb. 3, 2018), pp. 26-33, XP009531967, ISSN: 0532-8799, DOI: 10.2497/JJSPM.65.26 Retrieved from the Internet: URL:https://www.jstage.jst.go.jp/article/jspm/65/1/65_26/_pdf/-char/en.

The Indian Office Action dated Jan. 24, 2023 for the related Indian Patent Application No. 202147018165.

\* cited by examiner

SOLID ELECTROLYTE MATERIAL AND BATTERY INCLUDING THE SAME

BACKGROUND

1. Technical Field

The present disclosure relates to a solid electrolyte material and a battery including the solid electrolyte material.

2. Description of the Related Art

Japanese Unexamined Patent Application Publication No. 2011-129312 discloses an all-solid-state battery including a sulfide solid electrolyte material.

SUMMARY

One non-limiting and exemplary embodiment provides a solid electrolyte material having high lithium-ion conductivity.

In one general aspect, the techniques disclosed here feature a solid electrolyte material consisting essentially of Li, M, O, and X, wherein M is at least one element selected from the group consisting of Nb and Ta, and X is at least one element selected from the group consisting of Cl, Br, and I and includes Cl.

The present disclosure provides a solid electrolyte material having high lithium-ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will be described below with reference to the drawings.

First Embodiment

A solid electrolyte material according to a first embodiment contains Li, M, O, and X. M is at least one element selected from the group consisting of Nb and Ta, and X is at least one element selected from the group consisting of Cl, Br, and I and includes Cl. The solid electrolyte material according to the first embodiment has high lithium-ion conductivity.

The solid electrolyte material according to the first embodiment can maintain high lithium-ion conductivity in an expected battery operating temperature range (e.g., in the range of −30° C. to 80° C.). A battery including the solid electrolyte material according to the first embodiment can stably operate even in an environment with temperature changes.

From a safety viewpoint, the solid electrolyte material according to the first embodiment is preferably free of sulfur. The solid electrolyte material free of sulfur is safe because it does not produce hydrogen sulfide even under exposure to the atmosphere. It is noted that exposure of the sulfide solid electrolyte material disclosed in Japanese Unexamined Patent Application Publication No. 2011-129312 to the atmosphere may produce hydrogen sulfide.

To increase the ion conductivity of the solid electrolyte material, M may include Ta.

To increase the ion conductivity of the solid electrolyte material, the molar ratio of Ta to the total of Nb and Ta may be greater than or equal to 0.5 and less than or equal to 1.0. In other words, the following formula may be satisfied: $0.5 \leq m_{Ta}/(m_{Nb}+m_{Ta}) \leq 1.0$, where $m_{Nb}$ represents the amount of substance of Nb constituting M, and $m_{Ta}$ represents the amount of substance of Ta constituting M.

To further increase the ion conductivity of the solid electrolyte material, the following formula may be satisfied: $m_{Ta}/(m_{Nb}+m_{Ta})=1.0$. In other words, M may be Ta.

The solid electrolyte material according to the first embodiment may consist essentially of Li, M, O, and X. The expression "solid electrolyte material according to the first embodiment consists essentially of Li, M, O, and X" means that the molar ratio of the total amount of substance of Li, M, O, and X to the total amount of substance of all elements constituting the solid electrolyte material according to the first embodiment is greater than or equal to 90%. For example, the molar ratio may be greater than or equal to 95%.

To increase the ion conductivity of the solid electrolyte material, the solid electrolyte material according to the first embodiment may consist of Li, M, O, and X.

To increase the lithium-ion conductivity of the solid electrolyte material, X may include Cl and at least one element selected from the group consisting of bromine (i.e., Br) and iodine (i.e., I). In this case, the molar ratio of the amount of substance of Cl to the total amount of substance of all elements constituting X may be greater than or equal to 30%.

To increase the lithium-ion conductivity of the solid electrolyte material, X may be Cl.

The solid electrolyte material may contain a first crystal phase having a peak present in a first range of diffraction angles 2θ greater than or equal to 11.05° and less than or equal to 11.15° in the X-ray diffraction pattern obtained by X-ray diffraction analysis using Cu-Kα radiation. The first crystal phase has high lithium-ion conductivity. The presence of the first crystal phase in the solid electrolyte material according to the first embodiment facilitates formation of pathways for lithium ions to diffuse. As a result, the solid electrolyte material has high lithium-ion conductivity.

The X-ray diffraction is measured by the θ-2θ method using Cu-Kα radiation (wavelength 1.5405 Å and 1.5444 Å, i.e., wavelength 0.15405 nm and 0.15444 nm). The diffraction angle of a diffraction peak in an X-ray diffraction pattern means an angle corresponding to the maximum intensity of a projecting part that has a SN ratio (i.e., the ratio of signal S to background noise N) greater than or equal to 3 and a full width at half maximum less than or equal to 10°. The full width at half maximum refers to the width represented by a difference between two angles at which the intensities are half IMAX, where IMAX represents the maximum intensity of the diffraction peak.

In the X-ray diffraction pattern of the first crystal phase, the peak present in the first range shows, for example, the maximum intensity or the second maximum intensity.

To increase the ion conductivity of the solid electrolyte material, a peak from the first crystal phase may be present not only in the first range but also in a second range of diffraction angles 2θ greater than or equal to 17.85° and less than or equal to 17.96° in the X-ray diffraction pattern.

The solid electrolyte material according to the first embodiment may further contain a second crystal phase different from the first crystal phase. In other words, the solid electrolyte material may further contain a second crystal phase having a peak present at a diffraction angle 2θ different from that of the peak of the first crystal phase in the X-ray diffraction pattern. The presence of the second crystal phase may promote lithium-ion conduction between the first crystal phases. As a result, the solid electrolyte material has higher ion conductivity.

The second crystal phase is, for example, a crystal phase from LiCl.

The second crystal phase may be interposed between the first crystal phases.

To increase the ion conductivity of the solid electrolyte material, the molar ratio Li/M of Li to M may be greater than or equal to 0.60 and less than or equal to 2.4. Preferably, the molar ratio Li/M may be greater than or equal to 0.96 and less than or equal to 1.20. The Li concentration is optimized by selecting the molar ratio Li/M accordingly.

To increase the ion conductivity of the solid electrolyte material, the molar ratio O/X of O to M may be greater than or equal to 0.16 and less than or equal to 0.35. Preferably, the molar ratio O/X may be greater than or equal to 0.31 and less than or equal to 0.35. The first crystal phase is easily formed by selecting the molar ratio O/X accordingly.

The solid electrolyte material according to the first embodiment may have any shape. Examples of the shape include needle shape, spherical shape, and ellipsoid shape. The solid electrolyte material according to the first embodiment may be in the form of particles. The solid electrolyte material according to the first embodiment may be formed so as to have a pellet or plate shape.

When the solid electrolyte material according to the first embodiment has a particle shape (e.g., spherical shape), the solid electrolyte material may have a median diameter greater than or equal to 0.1 μm and less than or equal to 100 μm, or may have a median diameter greater than or equal to 0.5 μm and less than or equal to 10 μm. The solid electrolyte material according to the first embodiment thus has higher ion conductivity. Furthermore, the solid electrolyte material according to the first embodiment and other materials may be dispersed well.

The median diameter of particles means a particle size (d50) corresponding to a cumulative volume of 50% in the volume-based particle size distribution. The volume-based particle size distribution may be measured by a laser diffraction analyzer or an image analyzer.

When the solid electrolyte material according to the first embodiment has a particle shape (e.g., spherical shape), the solid electrolyte material may have a smaller median diameter than active materials. This configuration can provide a good dispersion state of the solid electrolyte material according to the first embodiment and the active materials.

The solid electrolyte material according to the first embodiment may be manufactured by the following method.

Material powders are prepared so as to obtain the intended composition. Examples of the material powders include oxides, hydroxides, halides, and acid halides.

For example, when the molar ratio Li/M and the molar ratio O/X are respectively 1.0 and 0.2 in a mixture of materials for the solid electrolyte material containing Li, Ta, O, and Cl, $Li_2O_2$ and $TaCl_5$ are prepared at a molar ratio of 1:2. The elemental species for M and X are determined by selecting the types of material powders. The molar ratios Li/M and O/X are determined by selecting the mixing ratio of material powders.

A mixture of material powders is caused to react mechanochemically (i.e., by the mechanochemical milling method) in a mixing device, such as a planetary ball mill, producing a reaction product. The reaction product may be fired in vacuum or in an inert atmosphere (e.g., argon atmosphere or nitrogen atmosphere). Alternatively, the reaction product may be produced by firing the mixture in vacuum or in an inert gas atmosphere. The solid electrolyte material according to the first embodiment is produced by these methods.

The firing may cause evaporation of part of M or part of X. As a result, the molar ratio Li/M and the molar ratio O/X of the produced solid electrolyte material may be larger than the values calculated from the molar quantities of prepared material powders. Specifically, the molar ratio Li/M may be larger by about 20%, and the molar ratio O/X may be larger by about 40% to 75%.

By selecting material powders, the mixing ratio of the material powders, and the reaction conditions, the solid electrolyte material according to the first embodiment to may be allowed to have intended diffraction peak positions (i.e., crystal structure).

The composition of the solid electrolyte material is determined by, for example, ICP emission spectrometry, ion chromatography, or inert gas fusion-infrared absorption method, or by using an EPMA (electron probe micro analyzer). The amount of oxygen may include an error of about 10%, which results from low measurement precision.

Second Embodiment

A second embodiment will be described below. The matters described in the first embodiment are appropriately omitted.

A battery according to a second embodiment includes a positive electrode, a negative electrode, and an electrolyte layer. The electrolyte layer is disposed between the positive electrode and the negative electrode. At least one selected from the group consisting of the positive electrode, the negative electrode, and the electrolyte layer contains the solid electrolyte material according to the first embodiment. The battery according to the second embodiment has good charging/discharging characteristics.

Figure 1:
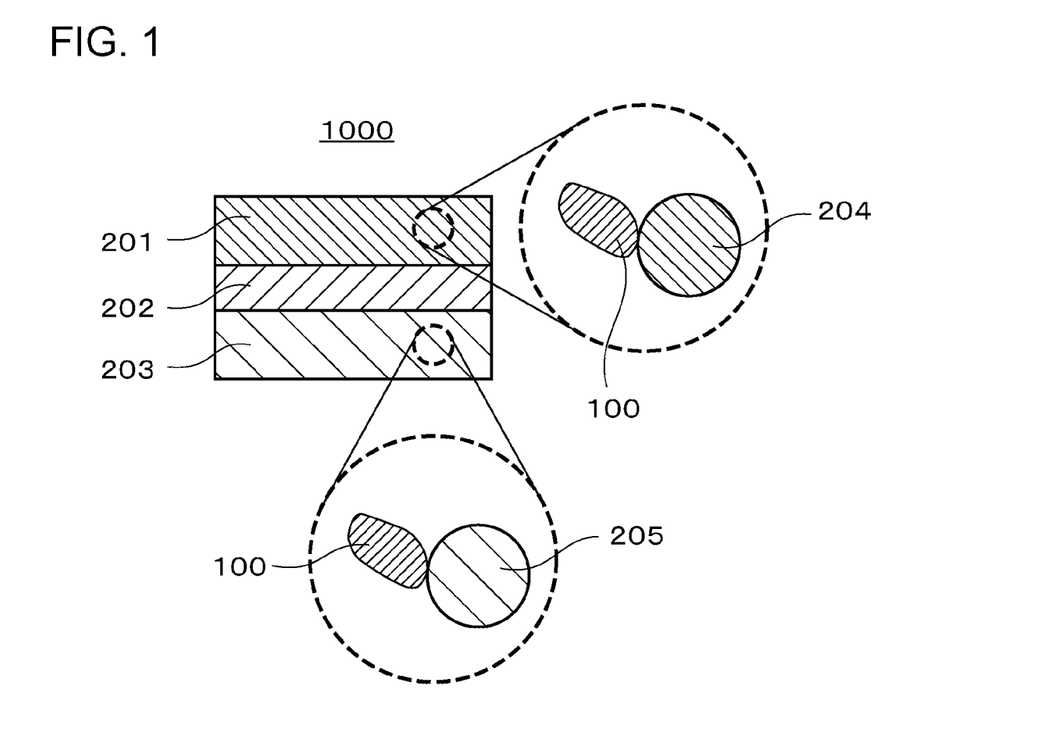
FIG. 1 is a cross-sectional view of a battery 1000 according to a second embodiment.

FIG. 1 is a cross-sectional view of a battery 1000 according to the second embodiment.

The battery 1000 includes a positive electrode 201, a negative electrode 203, and an electrolyte layer 202. The electrolyte layer 202 is disposed between the positive electrode 201 and the negative electrode 203.

The positive electrode 201 contains positive electrode active material particles 204 and solid electrolyte particles 100.

The electrolyte layer 202 contains an electrolyte material (e.g., solid electrolyte material).

The negative electrode 203 contains negative electrode active material particles 205 and solid electrolyte particles 100.

The solid electrolyte particles 100 are particles containing the solid electrolyte material according to the first embodiment. The solid electrolyte particles 100 may be particles containing the solid electrolyte material as a main component. The particles containing the solid electrolyte material according to the first embodiment as a main component mean particles containing the solid electrolyte material according to the first embodiment as a component with the highest content. The solid electrolyte particles 100 may be particles composed of the solid electrolyte material according to the first embodiment.

The positive electrode 201 contains a material capable of intercalating and deintercalating metal ions (i.e., lithium ions). The positive electrode 201 contains, for example, a positive electrode active material (e.g., positive electrode active material particles 204).

Examples of the positive electrode active material include lithium-containing transition metal oxides, transition metal fluorides, polyanion materials, fluorinated polyanion materials, transition metal sulfides, transition metal oxysulfides, and transition metal oxynitrides. Examples of lithium-containing transition metal oxides include $Li(NiCoAl)O_2$, $Li(NiCoMn)O_2$, and $LiCoO_2$.

From the viewpoint of battery costs and safety, lithium phosphate may be used as a positive electrode active material.

When the positive electrode 201 contains the solid electrolyte material according to the first embodiment and X includes I (i.e., iodine), lithium iron phosphate may be used as a positive electrode active material. The solid electrolyte material according to the first embodiment containing I is susceptible to oxidation. The use of lithium iron phosphate as a positive electrode active material reduces the oxidation reaction of the solid electrolyte material. In other words, the use of lithium iron phosphate reduces formation of an oxidized layer having low lithium-ion conductivity. As a result, the battery has high charging/discharging efficiency.

The positive electrode 201 may further contain a transition metal oxyfluoride as a positive electrode active material, in addition to the solid electrolyte material according to the first embodiment. The solid electrolyte material according to the first embodiment is unlikely to form a resistive layer even when being fluorinated by the transition metal oxyfluoride. As a result, the battery has high charging/discharging efficiency.

The transition metal oxyfluoride contains oxygen and fluorine. Examples of the transition metal oxyfluoride include compounds represented by composition formula $Li_pMe_qO_mF_n$. In the composition formula, Me is at least one element selected from the group consisting of Mn, Co, Ni, Fe, Al, Cu, V, Nb, Mo, Ti, Cr, Zr, Zn, Na, K, Ca, Mg, Pt, Au, Ag, Ru, W, B, Si, and P, and the following formulas are satisfied: $0.5 \leq p \leq 1.5$, $0.5 \leq q \leq 1.0$, $1 \leq m < 2$, and $0 < n \leq 1$. Examples of such a transition metal oxyfluoride include $Li_{1.05}(Ni_{0.35}Co_{0.35}Mn_{0.3})_{0.95}O_{1.9}F_{0.1}$.

The positive electrode active material particles 204 may have a median diameter greater than or equal to 0.1 μm and less than or equal to 100 μm. When the positive electrode active material particles 204 have a median diameter greater than or equal to 0.1 μm, the positive electrode active material particles 204 and the solid electrolyte particles 100 can be dispersed well in the positive electrode 201. This configuration improves the charging/discharging characteristics of the battery. When the positive electrode active material particles 204 have a median diameter less than or equal to 100 μm, the lithium diffusion rate in the positive electrode active material particles 204 is high. The battery may thus operate with high output power.

The positive electrode active material particles 204 may have a larger median diameter than the solid electrolyte particles 100. This configuration can provide a good dispersion state of the positive electrode active material particles 204 and the solid electrolyte particles 100.

From the viewpoint of the energy density and output power of the battery, the ratio of the volume of the positive electrode active material particles 204 to the total volume of the positive electrode active material particles 204 and the solid electrolyte particles 100 in the positive electrode 201 may be greater than or equal to 0.30 and less than or equal to 0.95.

Figure 2:
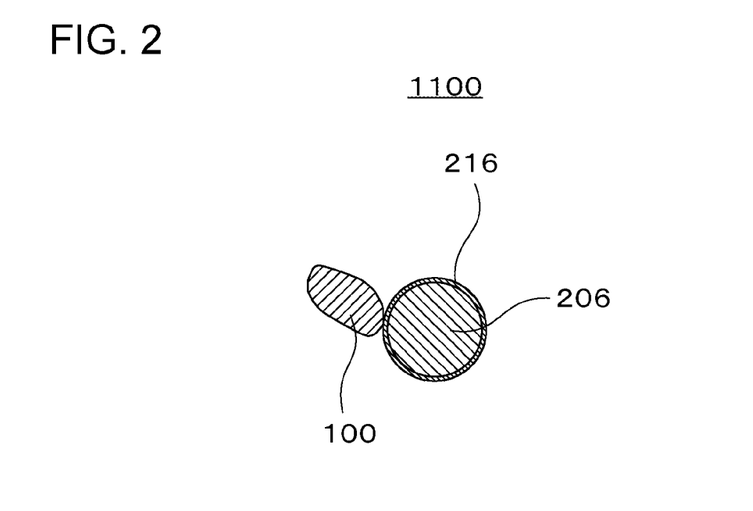
FIG. 2 is a cross-sectional view of an electrode material 1100 according to the second embodiment.

FIG. 2 is a cross-sectional view of an electrode material 1100 according to the second embodiment. The electrode material 1100 is contained in, for example, the positive electrode 201. To prevent electrode active material particles 206 from reacting with the solid electrolyte particles 100, a coating layer 216 may be formed on the surface of each electrode active material particle 206. This configuration can suppress an increase in reaction overpotential of the battery. Examples of the coating material contained in the coating layer 216 include sulfide solid electrolytes, oxide solid electrolytes, and halide solid electrolytes.

When the solid electrolyte particles 100 are formed of a sulfide solid electrolyte, the coating material may be the solid electrolyte material according to the first embodiment, and X may be at least one element selected from the group consisting of Cl and Br. Such a solid electrolyte material according to the first embodiment is less susceptible to oxidation than sulfide solid electrolytes. As a result, an increase in reaction overpotential of the battery can be suppressed.

When the solid electrolyte particles 100 are formed of the solid electrolyte material according to the first embodiment and X includes I, the coating material may be the solid electrolyte material according to the first embodiment, and X may be at least one element selected from the group consisting of Cl and Br. The solid electrolyte material according to the first embodiment free of I is less susceptible to oxidation than the solid electrolyte material according to the first embodiment containing I. The battery thus has high charging/discharging efficiency.

When the solid electrolyte particles 100 are formed of the solid electrolyte material according to the first embodiment and X includes I, the coating material may contain an oxide solid electrolyte. The oxide solid electrolyte may be lithium niobate having high stability even at high potential.

The positive electrode 201 may include a first positive electrode layer containing a first positive electrode active material and a second positive electrode layer containing a second positive electrode active material. The second positive electrode layer is disposed between the first positive electrode layer and the electrolyte layer 202. The first positive electrode layer and the second positive electrode layer contain the solid electrolyte material according to the first embodiment containing I. The coating layer 216 is formed on the surface of the second positive electrode active material. This configuration can prevent the solid electrolyte material according to the first embodiment contained in the electrolyte layer 202 from being oxidized by the second positive electrode active material. As a result, the battery has high charging capacity. Examples of the coating material contained in the coating layer 216 include sulfide solid electrolytes, oxide solid electrolytes, polymer solid electrolytes, and halide solid electrolytes. When the coating material is a halide solid electrolyte, the halide solid electrolyte does not contain I as a halogen element. The first positive electrode active material may be the same material as the second positive electrode active material or may be a material different from the second positive electrode active material.

From the viewpoint of the energy density and output power of the battery, the positive electrode 201 may have a thickness greater than or equal to 10 μm and less than or equal to 500 μm.

The electrolyte layer 202 contains an electrolyte material. The electrolyte material is, for example, a solid electrolyte material. The electrolyte layer 202 may be a solid electrolyte layer. The solid electrolyte material contained in the electrolyte layer 202 may contain the solid electrolyte material according to the first embodiment. The solid electrolyte material contained in the electrolyte layer 202 may consist of the solid electrolyte material according to the first embodiment.

The solid electrolyte material contained in the electrolyte layer 202 may consist of a solid electrolyte material different from the solid electrolyte material according to the first embodiment. Examples of the solid electrolyte material different from the solid electrolyte material according to the first embodiment include $Li_2MgX'_4$, $Li_2FeX'_4$, $Li(Al,Ga,In)X'_4$, $Li_3(Al,Ga,In)X_6$, and LiI. In the formulas, X is at least one element selected from the group consisting of F, Cl, Br, and I.

Hereinafter, the solid electrolyte material according to the first embodiment is also referred to as a first solid electrolyte material. The solid electrolyte material different from the solid electrolyte material according to the first embodiment is also referred to as a second solid electrolyte material.

The electrolyte layer 202 may further contain the second solid electrolyte material in addition to the first solid electrolyte material. The first solid electrolyte material and the second solid electrolyte material may be uniformly dispersed.

The electrolyte layer 202 may have a thickness greater than or equal to 1 μm and less than or equal to 100 μm. When the electrolyte layer 202 has a thickness greater than or equal to 1 μm, short-circuiting is unlikely to occur between the positive electrode 201 and the negative electrode 203. When the electrolyte layer 202 has a thickness less than or equal to 100 μm, the battery may operate with high output power.

The negative electrode 203 contains a material capable of intercalating and deintercalating metal ions (i.e., lithium ions). The negative electrode 203 contains, for example, a negative electrode active material (e.g., negative electrode active material particles 205).

Examples of the negative electrode active material include metal materials, carbon materials, oxides, nitrides, tin compounds, and silicon compounds. The metal materials may be single metals or alloys. Examples of the metal materials include lithium metal and lithium alloys. Examples of the carbon materials include natural graphite, coke, partially graphitized carbon, carbon fiber, spherical carbon, artificial graphite, and amorphous carbon. From the viewpoint of capacity density, suitable examples of the negative electrode active material include silicon (i.e., Si), tin (i.e., Sn), silicon compounds, and tin compounds.

The negative electrode active material may be selected on the basis of the reduction resistance of the solid electrolyte material contained in the negative electrode 203. When the negative electrode 203 contains the solid electrolyte material according to the first embodiment, a material capable of intercalating and deintercalating lithium ions at 0.27 V or more with respect to lithium may be used as a negative electrode active material. The use of such a material as a negative electrode active material can suppress the reduction of the solid electrolyte material according to the first embodiment contained in the negative electrode 203. As a result, the battery has high charging/discharging efficiency. Examples of the material include titanium oxide, indium metal, and lithium alloys. Examples of the titanium oxide include $Li_4Ti_5O_{12}$, $LiTi_2O_4$, and $TiO_2$.

The negative electrode active material particles 205 may have a median diameter greater than or equal to 0.1 μm and less than or equal to 100 μm. When the negative electrode active material particles 205 have a median diameter greater than or equal to 0.1 μm, the negative electrode active material particles 205 and the solid electrolyte particles 100 can be dispersed well in the negative electrode 203. This configuration improves the charging/discharging characteristics of the battery. When the negative electrode active material particles 205 have a median diameter less than or equal to 100 μm, the lithium diffusion rate in the negative electrode active material particles 205 is high. The battery may thus operate with high output.

The negative electrode active material particles 205 may have a larger median diameter than the solid electrolyte particles 100. This configuration can provide a good dispersion state of the negative electrode active material particles 205 and the solid electrolyte particles 100.

From the viewpoint of the energy density and output power of the battery, the ratio of the volume of the negative electrode active material particles 205 to the total volume of the negative electrode active material particles 205 and the solid electrolyte particles 100 in the negative electrode 203 may be greater than or equal to 0.30 and less than or equal to 0.95.

The electrode material 1100 shown in FIG. 2 may be contained in the negative electrode 203. To prevent the solid electrolyte particles 100 from reacting with the negative electrode active material (i.e., electrode active material particles 206), the coating layer 216 may be formed on the surface of each electrode active material particle 206. The battery thus has high charging/discharging efficiency. Examples of the coating material contained in the coating layer 216 include sulfide solid electrolytes, oxide solid electrolytes, polymer solid electrolytes, and halide solid electrolytes.

When the solid electrolyte particles 100 are formed of the solid electrolyte material according to the first embodiment, the coating material may be a sulfide solid electrolyte, an oxide solid electrolyte, or a polymer solid electrolyte. Examples of the sulfide solid electrolyte include $Li_2S$—$P_2S_5$. Examples of the oxide solid electrolyte include trilithium phosphate. Examples of the polymer solid electrolyte include a complex compound formed from polyethylene oxide and a lithium salt. Examples of such a polymer solid electrolyte include lithium bis(trifluoromethanesulfonyl)imide.

From the viewpoint of the energy density and output power of the battery, the negative electrode 203 may have a thickness greater than or equal to 10 μm and less than or equal to 500 μm.

To increase the ion conductivity, at least one selected from the group consisting of the positive electrode 201, the electrolyte layer 202, and the negative electrode 203 may contain the second solid electrolyte material. Examples of the second solid electrolyte material include sulfide solid electrolytes, oxide solid electrolytes, halide solid electrolytes, and organic polymer solid electrolytes.

In the present disclosure, the "sulfide solid electrolyte" means a solid electrolyte material containing sulfur. The "oxide solid electrolyte" means a solid electrolyte containing oxygen. The oxide solid electrolyte may contain anions (excluding sulfur anions and halogen anions) other than oxygen anions. The "halide solid electrolyte" means a solid electrolyte containing a halogen element and free of sulfur. The halide solid electrolyte may contain not only a halogen element but also oxygen.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

Examples of the oxide solid electrolyte include:
(i) NASICON solid electrolytes, such as $LiTi_2(PO_4)_3$ and element-substituted products thereof,
(ii) $(LaLi)TiO_3$-based perovskite solid electrolytes,
(iii) LISICON solid electrolytes, such as $Li_{14}ZnGe_4O_{16}$, $Li_4SiO_4$, $LiGeO_4$, and element-substituted products thereof,
(iv) garnet solid electrolytes, such as $Li_7La_3Zr_2O_{12}$ and element-substituted products thereof, and
(v) $LiaPO_4$ and N-substituted products thereof.

Examples of the halide solid electrolyte include compounds represented by $LiaMe'bY_cZ_6$, where the following formulas are satisfied: a+mb+3c=6 and c>0. Me' is at least one selected from the group consisting of metalloid elements and metal elements other than Li and Y. Z is at least one element selected from the group consisting of F, Cl, Br, and I. The value of m represents the valence of Me'.

The "metalloid elements" are B, Si, Ge, As, Sb, and Te.

The "metal elements" are all elements (excluding hydrogen) included in group 1 elements to group 12 elements in the periodic table and all elements (excluding B, Si, Ge, As, Sb, Te, C, N, P, O, S, and Se) included in group 13 elements to group 16 elements in the periodic table.

Me' may be at least one selected from the group consisting of Mg, Ca, Sr, Ba, Zn, Sc, Al, Ga, Bi, Zr, Hf, Ti, Sn, Ta, and Nb.

Examples of the halide solid electrolyte include $Li_3YCl_6$ and $Li_3YBr_6$.

When the electrolyte layer 202 contains the solid electrolyte material according to the first embodiment, the negative electrode 203 may contain a sulfide solid electrolyte material. The sulfide solid electrolyte material, which is electrochemically stable against the negative electrode active material, reduces contact between the solid electrolyte material according to the first embodiment and the negative electrode active material. As a result, the battery has low internal resistance.

Examples of the organic polymer solid electrolytes include compounds formed from a polymer compound and a lithium salt. The polymer compound may have an ethylene oxide structure. The polymer compound having an ethylene oxide structure can contain more lithium salt and thus has a higher ion conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, two or more lithium salts selected from these may be used as a mixture.

To facilitate exchange of lithium ions and improve the output characteristics of the battery, at least one selected from the group consisting of the positive electrode 201, the electrolyte layer 202, and the negative electrode 203 may contain a non-aqueous electrolyte solution, a gel electrolyte, or an ionic liquid.

The non-aqueous electrolyte solution contains a non-aqueous solvent and a lithium salt dissolved in the non-aqueous solvent. Examples of the non-aqueous solvent include cyclic carbonate solvents, chain carbonate solvents, cyclic ether solvents, chain ether solvents, cyclic ester solvents, chain ester solvents, and fluorinated solvents. Examples of the cyclic carbonate solvents include ethylene carbonate, propylene carbonate, and butylene carbonate. Examples of the chain carbonate solvents include dimethyl carbonate, ethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorinated solvents include fluoroethylene carbonate, methyl fluoropropionate, fluorobenzene, fluoroethyl methyl carbonate, and fluorodimethylene carbonate. One non-aqueous solvent selected from these may be used alone. Alternatively, two or more non-aqueous solvents selected from these may be used as a mixture.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, two or more lithium salts selected from these may be used as a mixture. The concentration of the lithium salt is, for example, in the range of 0.5 mol/liter or greater and 2 mol/liter or less.

The gel electrolyte may be a polymer material impregnated with a non-aqueous electrolyte solution. Examples of the polymer material include polyethylene oxide, polyacrylonitrile, polyvinylidene fluoride, polymethyl methacrylate, and a polymer having an ethylene oxide bond.

Examples of the cation contained in the ionic liquid include:
(i) chain aliphatic quaternary salts, such as tetraalkylammonium and tetraalkylphosphonium,
(ii) alicyclic ammoniums, such as pyrrolidiniums, morpholiniums, imidazoliniums, tetrahydropyrimidiniums, piperaziniums, and piperidiniums, and
(iii) nitrogen-containing heterocyclic aromatic cations, such as pyridiniums and imidazoliums.

Examples of the anion contained in the ionic liquid include $PF_6-$, $BF_4-$, $SbF_6-$, $AsF_6-$, $SO_3CF_3-$, $N(SO_2CF_3)_2-$, $N(SO_2C_2F_5)_2-$, $N(SO_2CF_3)(SO_2C_4F_9)-$, and $C(SO_2CF_3)_3-$.

The ionic liquid may contain a lithium salt.

To improve the adhesion between particles, at least one selected from the positive electrode 201, the electrolyte layer 202, and the negative electrode 203 may contain a binder.

Examples of the binder include polyvinylidene fluoride, polytetrafluoroethylene, polyethylene, polypropylene, aramid resin, polyamide, polyimide, polyamideimide, polyacrylonitrile, poly(acrylic acid), poly(methyl acrylate), poly (ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose. The binder may be a copolymer. Examples of the binder include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from these materials may be used.

To increase the electronic conductivity, at least one selected from the positive electrode 201 and the negative electrode 203 may contain a conductive assistant.

Examples of the conductive assistant include:
(i) graphites, such as natural graphite and artificial graphite,
(ii) carbon blacks, such as acetylene black and Ketjenblack,
(iii) conductive fibers, such as carbon fibers and metal fibers,
(iv) fluorinated carbon,
(v) metal powders, such as aluminum powder,
(vi) conductive whiskers, such as zinc oxide whisker and potassium titanate whisker,
(vii) conductive metal oxides, such as titanium oxide, and
(viii) conductive polymer compounds, such as polyaniline, polypyrrole, and polythiophene.

To reduce the cost, the conductive assistant (i) or (ii) may be used.

Examples of the shape of the battery according to the second embodiment include coin shape, cylindrical shape, prismatic shape, sheet shape, button shape, flat shape, and stack shape.

EXAMPLES

The present disclosure will be described below in more detail with reference to Examples.

Sample 1

Production of Solid Electrolyte Material

In a dry atmosphere having a dew point lower than or equal to −30° C. (hereinafter referred to as a "dry atmosphere"), $Li_2O_2$ and $TaCl_5$ were prepared as material powders such that the molar ratio $Li_2O_2:TaCl_6$ was 1:2. These material powders were ground and mixed in a mortar to produce a mixed powder. The produced mixed powder was milled in a planetary ball mill at 600 rpm for 24 hours. Next, the mixed powder was fired at 200° C. for 6 hours. A powder of a solid electrolyte material according to Sample 1 containing a crystal phase composed of Li, Ta, O, and Cl was produced accordingly.

The Li content and the Ta content of the solid electrolyte material according to Sample 1 were determined by high-frequency inductively coupled plasma-optical emission spectrometry using a high-frequency inductively coupled plasma-optical emission spectrophotometer (iCAP 7400 available from Thermo Fisher Scientific Inc.,). The Cl content of the solid electrolyte material according to Sample 1 was determined by ion chromatography using an ion chromatography system (ICS-2000 available from Dionex Corporation). The O content of the solid electrolyte material according to Sample 1 was determined by an inert gas fusion-infrared absorption method using an oxygen analyzer (EMGA-930 available from HORIBA, Ltd.). As a result, the solid electrolyte material of Sample 1 had a molar ratio Li/Ta of 1.20 and a molar ratio O/Cl of 0.35.

Evaluation of Ion Conductivity

Figure 3:
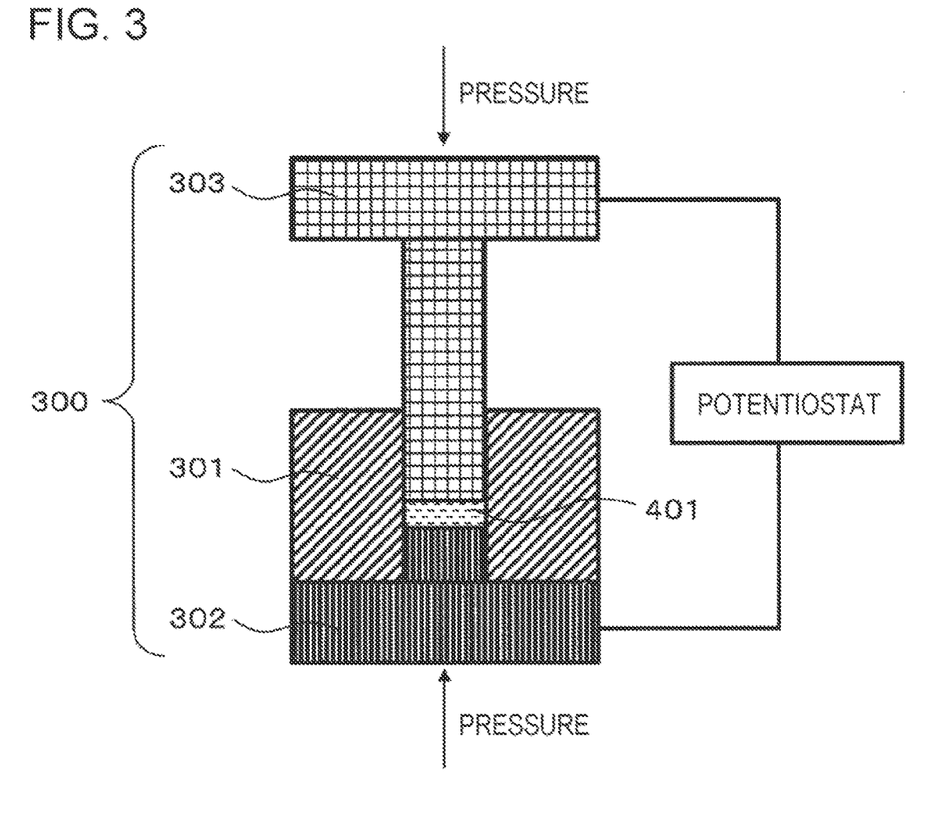
FIG. 3 is a schematic view of a compression molding dice 300 used to evaluate the ion conductivity of a solid electrolyte material.

FIG. 3 is a schematic view of the compression molding dice 300 used to evaluate the ion conductivity of the solid electrolyte material.

The compression molding dice 300 included a frame mold 301, a punch lower part 302, and a punch upper part 303. The frame mold 301 was formed of insulating polycarbonate. The punch upper part 303 and the punch lower part 302 were both formed of stainless steel having electronic conductivity.

The ion conductivity of the solid electrolyte material according to Sample 1 was measured by the following method using the compression molding dice 300 shown in FIG. 3.

In a dry atmosphere, a powder of the solid electrolyte material according to Sample 1 (i.e., a powder 401 of the solid electrolyte material in FIG. 3) was charged into the compression molding dice 300. In the compression molding dice 300, a pressure of 300 MPa was applied to the solid electrolyte material according to Sample 1 by using the punch lower part 302 and the punch upper part 303. An ion conductivity measuring cell according to Sample 1 was produced accordingly.

With the pressure applied, the punch lower part 302 and the punch upper part 303 were connected to a potentiostat (VersaSTAT4 available from Princeton Applied Research) with a frequency response analyzer. The punch upper part 303 was connected to a working electrode and a potential measuring terminal. The punch lower part 302 was connected to a counter electrode and a reference electrode. The ion conductivity of the solid electrolyte material according to Sample 1 was measured at room temperature by the electrochemical impedance measuring method. As a result, the ion conductivity measured at 22° C. was 8.2 mS/cm.

Evaluation of Temperature Dependence of Ion Conductivity

Figure 4:
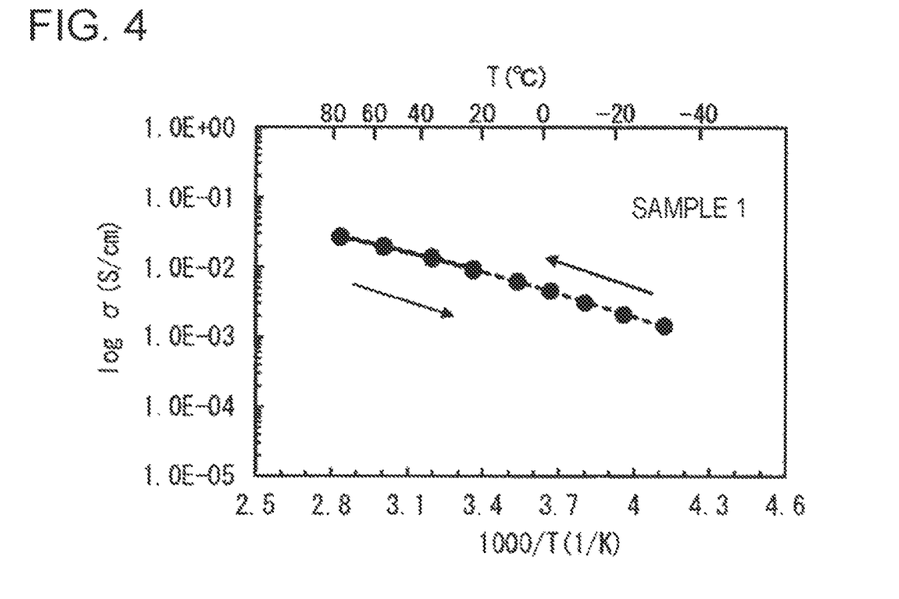
FIG. 4 is a graph showing the temperature dependence of the ion conductivity of a solid electrolyte material according to Sample 1.

FIG. 4 is a graph showing the temperature dependence of the ion conductivity of the solid electrolyte material according to Sample 1. The results shown in FIG. 4 were measured by the following method.

The ion conductivity measuring cell according to Sample 1 was placed in a thermostatic chamber. The ion conductivity was measured in the range of −30° C. to 80° C. in both the heating process and the cooling process.

As shown in FIG. 4, the solid electrolyte material according to Sample 1 maintained high lithium-ion conductivity in the range of −30° C. to 80° C.

X-Ray Diffraction

Figure 5:
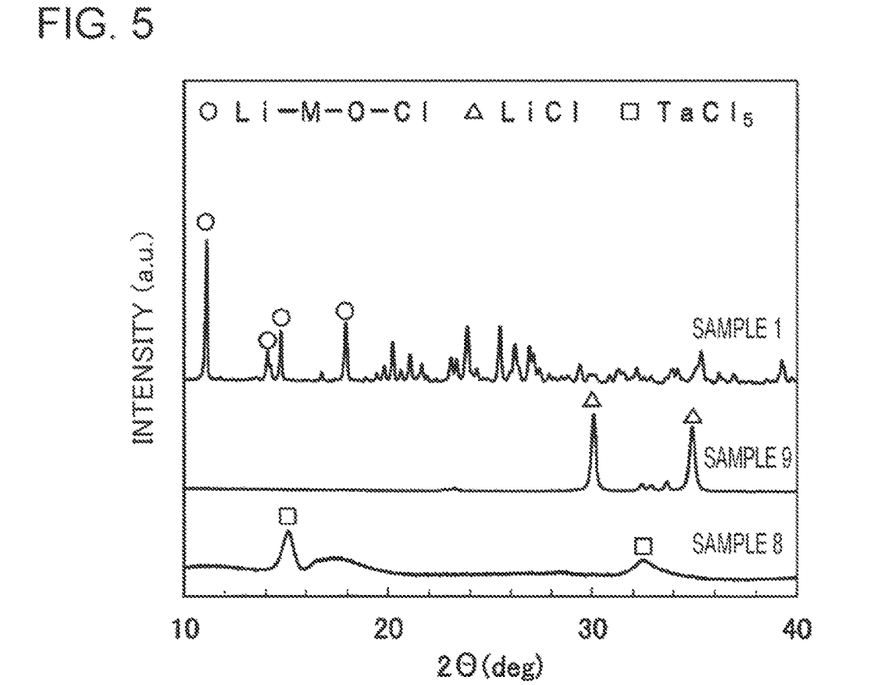
FIG. 5 is a graph showing the X-ray diffraction patterns of solid electrolyte materials according to Samples 1, 8, and 9.

FIG. 5 is a graph showing the X-ray diffraction pattern of the solid electrolyte material according to Sample 1. The results shown in FIG. 5 were measured by the following method.

The X-ray diffraction pattern of the solid electrolyte material according to Sample 1 was measured by using an X-ray diffractometer (MiniFlex600 available from Rigaku Corporation) in a dry atmosphere having a dew point lower than or equal to −45° C. As an X-ray source, Cu-Kα radiation (wavelength 1.5405 Å and 1.5444 Å) was used.

The solid electrolyte material according to Sample 1 had a diffraction peak at 11.08° (i.e., in the first range). This result means that the solid electrolyte material according to Sample 1 contains a crystal phase with high lithium-ion conductivity (i.e., first crystal phase). The solid electrolyte material according to Sample 1 further had a diffraction peak at 17.92° (i.e., in the second range).

The solid electrolyte material according to Sample 1 further had a diffraction peak from LiCl. This means that the solid electrolyte material according to Sample 1 contains a second crystal phase different from the first crystal phase.

Production of Battery

The solid electrolyte material according to Sample 1 and LiCoO$_2$, a positive electrode active material, were prepared at a volume ratio of 50:50 in an argon atmosphere having a dew point lower than or equal to −60° C. These materials were mixed in a mortar to form a mixture.

The solid electrolyte material (100 mg) according to Sample 1 and the mixture (10.6 mg) were stacked in order in an insulating cylinder having an inner diameter of 9.5 mm to form a multilayer body. A pressure of 360 MPa was applied to the multilayer body to form a solid electrolyte layer and a positive electrode. The solid electrolyte layer had a thickness of 500 μm.

Next, a Li—In alloy having a thickness of 200 μm was stacked on the solid electrolyte layer to form a multilayer body. A pressure of 80 MPa was applied to the multilayer body to form a negative electrode.

A current collector formed of stainless steel was attached to each of the positive electrode and the negative electrode, and a current collector lead was attached to each current collector.

Finally, the inside of the insulating cylinder was shut off from the outside atmosphere by using insulated ferrules, whereby the cylinder was sealed.

A battery according to Sample 1 was produced accordingly.

Charging-Discharging Test

Figure 7:
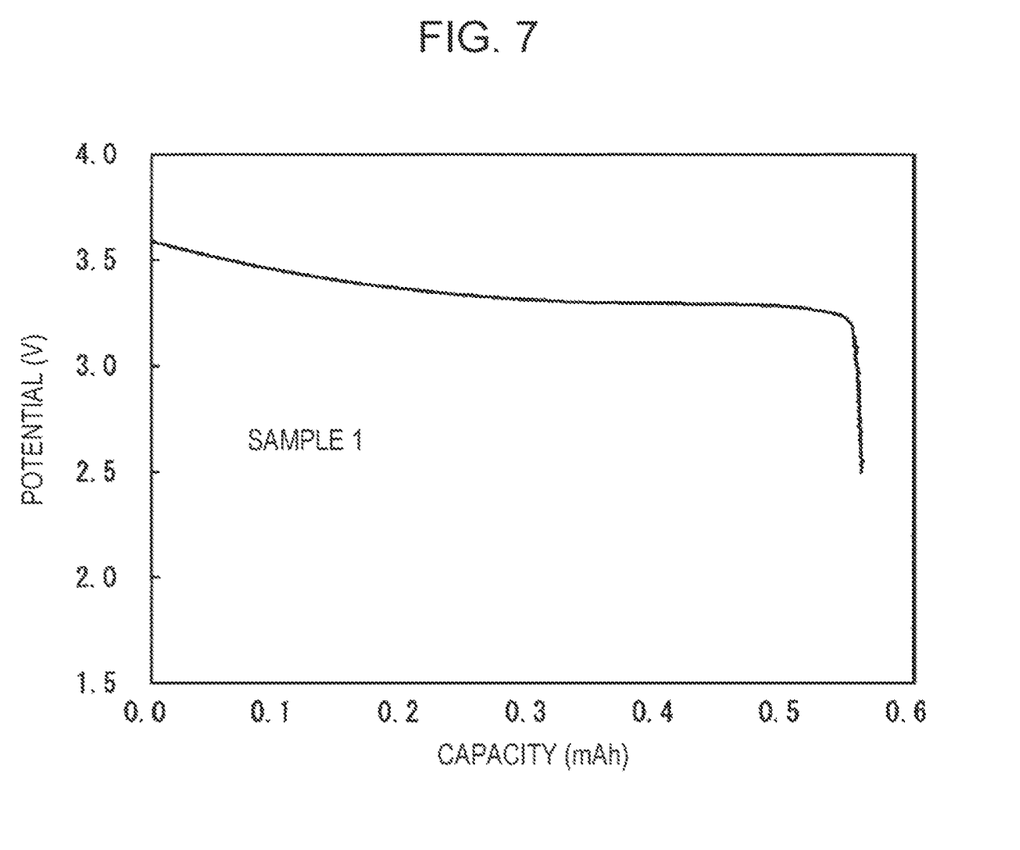
FIG. 7 is a graph showing the initial discharging characteristics of a battery according to Sample 1.

FIG. 7 is a graph showing the initial discharging characteristics of the battery according to Sample 1. The results shown in FIG. 7 were measured by the following method.

The battery according to Sample 1 was placed in a thermostatic chamber at 25° C.

The battery according to Sample 1 was charged to a voltage of 3.6 V at a current density of 80 μA/cm$^2$. This current density corresponds to 0.05 C rate. The battery according to Sample 1 was next discharged to a voltage of 2.5 V at a current density of 80 μA/cm$^2$. This current density corresponds to 0.05 C rate.

As a result of the charging-discharging test, the battery according to Sample 1 had an initial discharge capacity of 0.56 mAh.

Sample 2

Li$_2$O$_2$ and TaCl$_5$ were prepared as material powders such that the molar ratio Li$_2$O$_2$:TaCl$_5$ was 0.9:2. Otherwise, a solid electrolyte material according to Sample 2 was produced in the same manner as Sample 1. The solid electrolyte material according to Sample 2 had a molar ratio Li/Ta of 1.08 and a molar ratio O/Cl of 0.31.

The ion conductivity of the solid electrolyte material according to Sample 2 was measured in the same manner as Sample 1. As a result, the ion conductivity measured at 22° C. was 9.0 mS/cm.

Figure 6:
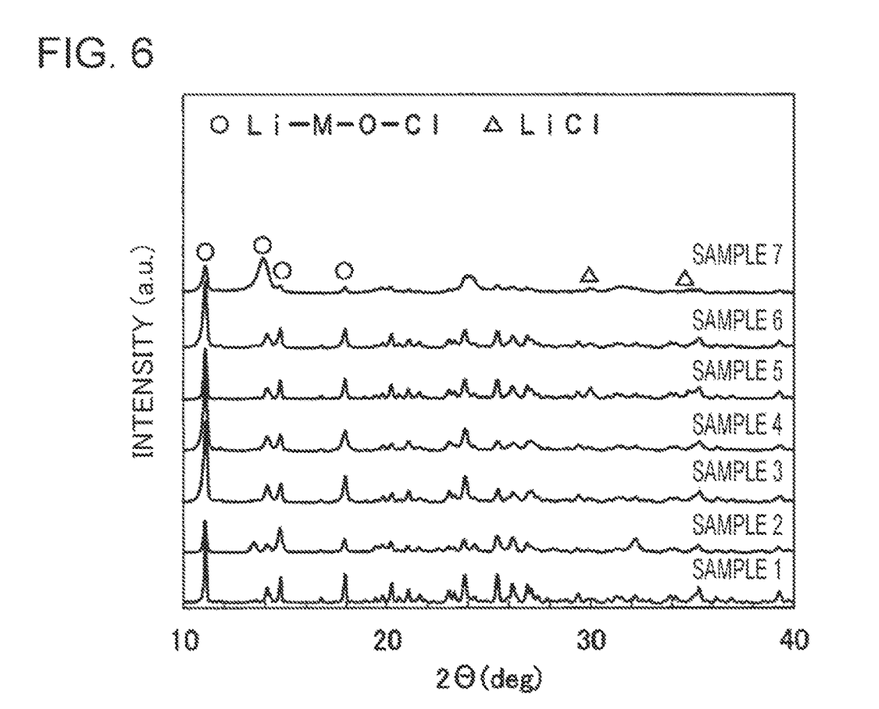
FIG. 6 is a graph showing the X-ray diffraction patterns of solid electrolyte materials according to Samples 1 to 7.

The X-ray diffraction pattern of the solid electrolyte material according to Sample 2 was measured in the same manner as Sample 1. The result of the measurement is shown in FIG. 6. The solid electrolyte material according to Sample 2 had diffraction peaks at 11.06° (i.e., in the first range) and 17.88° (i.e., in the second range). The solid electrolyte material according to Sample 2 further had a diffraction peak from LiCl. Therefore, the solid electrolyte material according to Sample 2 contained the first crystal phase and the second crystal phase.

Sample 3

Li$_2$O$_2$ and TaCl$_5$ were prepared as material powders such that the molar ratio Li$_2$O$_2$:TaCl$_5$ was 0.8:2. Otherwise, a solid electrolyte material according to Sample 3 was produced in the same manner as Sample 1. The solid electrolyte material according to Sample 3 had a molar ratio Li/Ta of 0.96 and a molar ratio O/Cl of 0.27.

The ion conductivity of the solid electrolyte material according to Sample 3 was measured in the same manner as Sample 1. As a result, the ion conductivity measured at 22° C. was 6.5 mS/cm.

The X-ray diffraction pattern of the solid electrolyte material according to Sample 3 was measured in the same manner as Sample 1. The result of the measurement is shown in FIG. 6. The solid electrolyte material according to Sample 3 had diffraction peaks at 11.09° (i.e., in the first range) and 17.96° (i.e., in the second range). The solid electrolyte material according to Sample 3 further had a diffraction peak from LiCl. Therefore, the solid electrolyte material according to Sample 3 contained the first crystal phase and the second crystal phase.

Sample 4

Li$_2$O$_2$ and TaCl$_5$ were prepared as material powders such that the molar ratio Li$_2$O$_2$:TaCl$_5$ was 0.5:2. Otherwise, a solid electrolyte material according to Sample 4 was produced in the same manner as Sample 1. The solid electrolyte material according to Sample 4 had a molar ratio Li/Ta of 0.60 and a molar ratio O/Cl of 0.16.

The ion conductivity of the solid electrolyte material according to Sample 4 was measured in the same manner as Sample 1. As a result, the ion conductivity measured at 22° C. was 4.9 mS/cm.

The X-ray diffraction pattern of the solid electrolyte material according to Sample 4 was measured in the same manner as Sample 1. The result of the measurement is shown in FIG. 6. The solid electrolyte material according to Sample 4 had diffraction peaks at 11.08° (i.e., in the first range) and 17.93° (i.e., in the second range). The solid electrolyte material according to Sample 4 further had a diffraction peak from LiCl. Therefore, the solid electrolyte material according to Sample 4 contained the first crystal phase and the second crystal phase.

Sample 5

Li$_2$O and TaCl$_5$ were prepared as material powders such that the molar ratio Li$_2$O$_2$:TaCl$_5$ was 1:1. Otherwise, a solid electrolyte material according to Sample 5 was produced in the same manner as Sample 1. The solid electrolyte material according to Sample 5 had a molar ratio Li/Ta of 2.40 and a molar ratio O/Cl of 0.28.

The ion conductivity of the solid electrolyte material according to Sample 5 was measured in the same manner as Sample 1. As a result, the ion conductivity measured at 22° C. was 3.3 mS/cm.

The X-ray diffraction pattern of the solid electrolyte material according to Sample 5 was measured in the same manner as Sample 1. The result of the measurement is shown in FIG. 6. The solid electrolyte material according to Sample 5 had diffraction peaks at 11.08° (i.e., in the first range) and 17.92° (i.e., in the second range). The solid electrolyte material according to Sample 5 further had a diffraction peak from LiCl. Therefore, the solid electrolyte material according to Sample 5 contained the first crystal phase and the second crystal phase.

Sample 6

Li$_2$O$_2$, TaCl$_5$, and NbCl$_5$ were prepared as material powders such that the molar ratio Li$_2$O$_2$:TaCl$_5$:NbCl$_5$ was 1:1.6:0.4. Otherwise, a solid electrolyte material according to Sample 6 was produced in the same manner as Sample 1. The solid electrolyte material according to Sample 6 had a molar ratio Li/(Ta+Nb) of 1.20 and a molar ratio O/Cl of 0.35.

The ion conductivity of the solid electrolyte material according to Sample 6 was measured in the same manner as Sample 1. As a result, the ion conductivity measured at 22° C. was 6.7 mS/cm.

The X-ray diffraction pattern of the solid electrolyte material according to Sample 6 was measured in the same manner as Sample 1. The result of the measurement is shown in FIG. 6. The solid electrolyte material according to Sample 6 had diffraction peaks at 11.09° (i.e., in the first range) and 17.93° (i.e., in the second range). The solid electrolyte material according to Sample 6 further had a diffraction peak from LiCl. Therefore, the solid electrolyte material according to Sample 6 contained the first crystal phase and the second crystal phase.

Sample 7

$Li_2O_2$, $TaCl_5$, and $NbCl_5$ were prepared as material powders such that the molar ratio $Li_2O_2$:$TaCl_5$:$NbCl_5$ was 1:1:1. Otherwise, a solid electrolyte material according to Sample 7 was produced in the same manner as Sample 1. The solid electrolyte material according to Sample 7 had a molar ratio Li/(Ta+Nb) of 1.20 and a molar ratio O/Cl of 0.35.

The ion conductivity of the solid electrolyte material according to Sample 7 was measured in the same manner as Sample 1. As a result, the ion conductivity measured at 22° C. was 5.7 mS/cm.

The X-ray diffraction pattern of the solid electrolyte material according to Sample 7 was measured in the same manner as Sample 1. The result of the measurement is shown in FIG. 6. The solid electrolyte material according to Sample 7 had diffraction peaks at 11.07° (i.e., in the first range) and 17.91° (i.e., in the second range). The solid electrolyte material according to Sample 7 further had a diffraction peak from LiCl. Therefore, the solid electrolyte material according to Sample 7 contained the first crystal phase and the second crystal phase.

Sample 8

LiCl and $TaCl_5$ were prepared as material powders such that the molar ratio LiCl:$TaCl_5$ was 1:1. Otherwise, a solid electrolyte material according to Sample 8 was produced in the same manner as Sample 1. The solid electrolyte material according to Sample 8 had a molar ratio Li/Ta of 1.0 and a molar ratio O/Cl of 0. In other words, the solid electrolyte material according to Sample 8 was free of O (i.e., oxygen).

The ion conductivity of the solid electrolyte material according to Sample 8 was measured in the same manner as Sample 1. As a result, the ion conductivity measured at 22° C. was $5.6 \times 10^{-4}$ mS/cm.

The X-ray diffraction pattern of the solid electrolyte material according to Sample 8 was measured in the same manner as Sample 1. The result of the measurement is shown in FIG. 5. The solid electrolyte material according to Sample 8 had no diffraction peak in the first range and the second range. Therefore, the solid electrolyte material according to Sample 8 did not contain the first crystal phase.

Sample 9

LiCl and $Li_2O_2$ were prepared as material powders such that the molar ratio LiCl:$Li_2O_2$ was 1:1. Otherwise, a solid electrolyte material according to Sample 9 was produced in the same manner as Sample 1. The solid electrolyte material according to Sample 9 had a molar ratio O/Cl of 0.5. Therefore, the solid electrolyte material according to Sample 9 was free of element M.

The ion conductivity of the solid electrolyte material according to Sample 9 was measured in the same manner as Sample 1. As a result, the ion conductivity measured at 22° C. was $1.2 \times 10^{-5}$ mS/cm.

The X-ray diffraction pattern of the solid electrolyte material according to Sample 9 was measured in the same manner as Sample 1. The result of the measurement is shown in FIG. 5. The solid electrolyte material according to Sample 9 had no diffraction peak in the first range and the second range. Therefore, the solid electrolyte material according to Sample 9 did not contain the first crystal phase.

The constituent elements, molar ratios, and results of the measurement of Samples 1 to 9 were shown in Table 1.

TABLE 1

| | Constituent Elements | Ta/M | Li/M | O/Cl | Diffraction Peak Angle in First Range | Diffraction Peak Angle in Second Range | Ion Conductivity (mS/cm) |
|---|---|---|---|---|---|---|---|
| Sample 1 | Li, Ta, O, Cl | 1.0 | 1.20 | 0.35 | 11.08° | 17.92° | 8.2 |
| Sample 2 | Li, Ta, O, Cl | 1.0 | 1.08 | 0.31 | 11.06° | 17.88° | 9.0 |
| Sample 3 | Li, Ta, O, Cl | 1.0 | 0.96 | 0.27 | 11.09° | 17.96° | 6.5 |
| Sample 4 | Li, Ta, O, Cl | 1.0 | 0.60 | 0.16 | 11.08° | 17.93° | 4.9 |
| Sample 5 | Li, Ta, O, Cl | 1.0 | 2.40 | 0.28 | 11.08° | 17.92° | 3.3 |
| Sample 6 | Li, Ta, Nb, O, Cl | 0.8 | 1.20 | 0.35 | 11.09° | 17.93° | 6.7 |
| Sample 7 | Li, Ta, Nb, O, Cl | 0.5 | 1.20 | 0.35 | 11.07° | 17.91° | 5.7 |
| Sample 8 | Li, Ta, Cl | 1.0 | 1.00 | 0.00 | — | — | $5.6 \times 10^{-4}$ |
| Sample 9 | Li, O, Cl | — | — | 0.5 | — | — | $1.2 \times 10^{-5}$ |

DISCUSSION

Table 1 shows that the solid electrolyte materials according to Samples 1 to 7 each have a high ion conductivity greater than or equal to $1 \times 10^4$ mS/cm at room temperature.

As shown in FIG. 4, the solid electrolyte material according to Sample 1 has a high lithium-ion conductivity in an expected battery operating temperature range.

The battery according to Sample 1 was charged and discharged at room temperature.

As being apparent from comparison of Samples 1 and 6 with Sample 7, the solid electrolyte materials that satisfy the formula of $0.8 \leq m_{Ta}/(m_{Nb}+m_{Ta}) \leq 1.0$ have higher ion conductivities. As being apparent from comparison of Sample 1 with Sample 6, the solid electrolyte material that satisfies the formula of $m_{Ta}/(m_{Nb}+m_{Ta})=1$ (i.e., in which M is Ta) has a higher ion conductivity.

As being apparent from comparison of Samples 1, 2, and 3 with Samples 4 and 5, the solid electrolyte materials that each have a molar ratio Li/M greater than or equal to 0.96 and less than or equal to 1.20 have higher ion conductivities.

As being apparent from comparison of Samples 1 and 2 with Samples 3 to 5, the solid electrolyte materials that each have a molar ratio O/Cl greater than or equal to 0.31 and less than or equal to 0.35 have higher ion conductivities.

Since the solid electrolyte material according to the present disclosure has high lithium-ion conductivity as described above, the solid electrolyte material according to the present disclosure is suitable for providing a battery having good charging/discharging characteristics.

The solid electrolyte material according to the present disclosure is used for, for example, an all-solid-state lithium-ion secondary battery.

What is claimed is:

1. A solid electrolyte material consisting essentially of Li, M, O, and X, wherein:
   M is at least one element selected from the group consisting of Nb and Ta,
   X is at least one element selected from the group consisting of Cl, Br, and I,
   the solid electrolyte material includes Ta and Cl, and
   a total amount of Li, M, O, and X to a total amount of all elements constituting the solid electrolyte material is equal to or greater than 95%.

2. The solid electrolyte material according to claim 1, wherein M is Ta.

3. The solid electrolyte material according to claim 1, wherein a molar ratio of Ta to a total of Nb and Ta is greater than or equal to 0.5 and less than 1.0.

4. The solid electrolyte material according to claim 1, wherein the solid electrolyte material contains a first crystal phase having a peak present in a first range of diffraction angles 2θ greater than or equal to 11.05° and less than or equal to 11.15° in an X-ray diffraction pattern obtained by X-ray diffraction analysis using Cu-Kα radiation.

5. The solid electrolyte material according to claim 4, wherein, in the X-ray diffraction pattern, a peak from the first crystal phase is further present in a second range of diffraction angles 2θ greater than or equal to 17.85° and less than or equal to 17.96°.

6. The solid electrolyte material according to claim 4, wherein the solid electrolyte material further contains a second crystal phase different from the first crystal phase.

7. The solid electrolyte material according to claim 1, wherein a molar ratio Li/M is greater than or equal to 0.60 and less than or equal to 2.4.

8. The solid electrolyte material according to claim 7, wherein the molar ratio Li/M is greater than or equal to 0.96 and less than or equal to 1.20.

9. The solid electrolyte material according to claim 1, wherein a molar ratio O/X is greater than or equal to 0.16 and less than or equal to 0.35.

10. The solid electrolyte material according to claim 9, wherein the molar ratio O/X is greater than or equal to 0.31 and less than or equal to 0.35.

11. A battery comprising:
    a positive electrode;
    a negative electrode; and
    an electrolyte layer disposed between the positive electrode and the negative electrode,
    wherein at least one selected from the group consisting of the positive electrode, the negative electrode, and the electrolyte layer contains the solid electrolyte material according to claim 1.

12. The solid electrolyte material according to claim 1, wherein the solid electrolyte material consists of Li, M, O, and X.

13. The solid electrolyte material according to claim 1, wherein the solid electrolyte material consists of Li, Ta, O, and Cl.

* * * * *